Aug. 23, 1960  R. A. FERRELL  2,949,981
WALL STRUCTURE
Filed Dec. 17, 1957  8 Sheets-Sheet 1
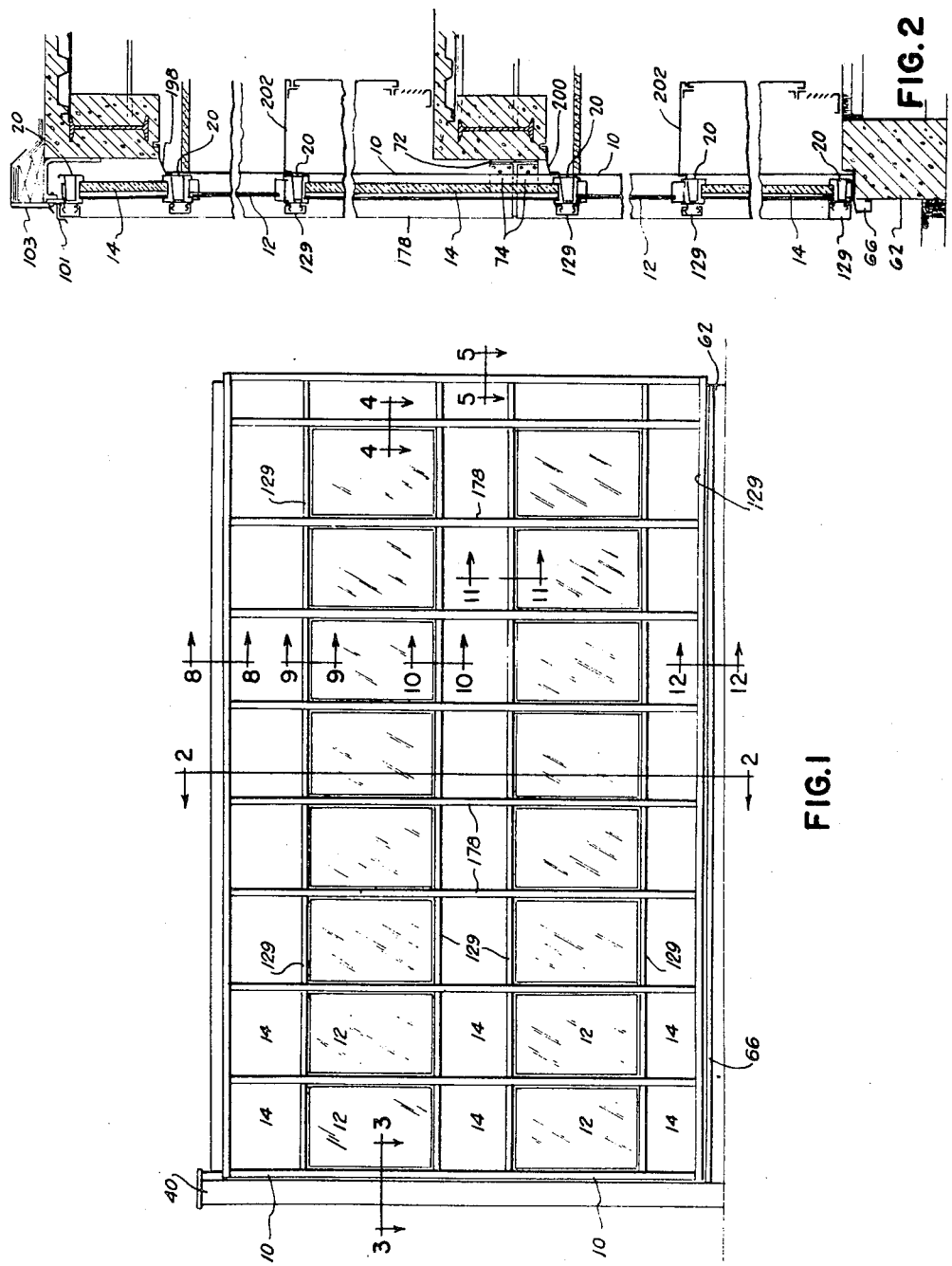
INVENTOR.
Russell A. Ferrell
BY Robert R. Churchill
ATTORNEY

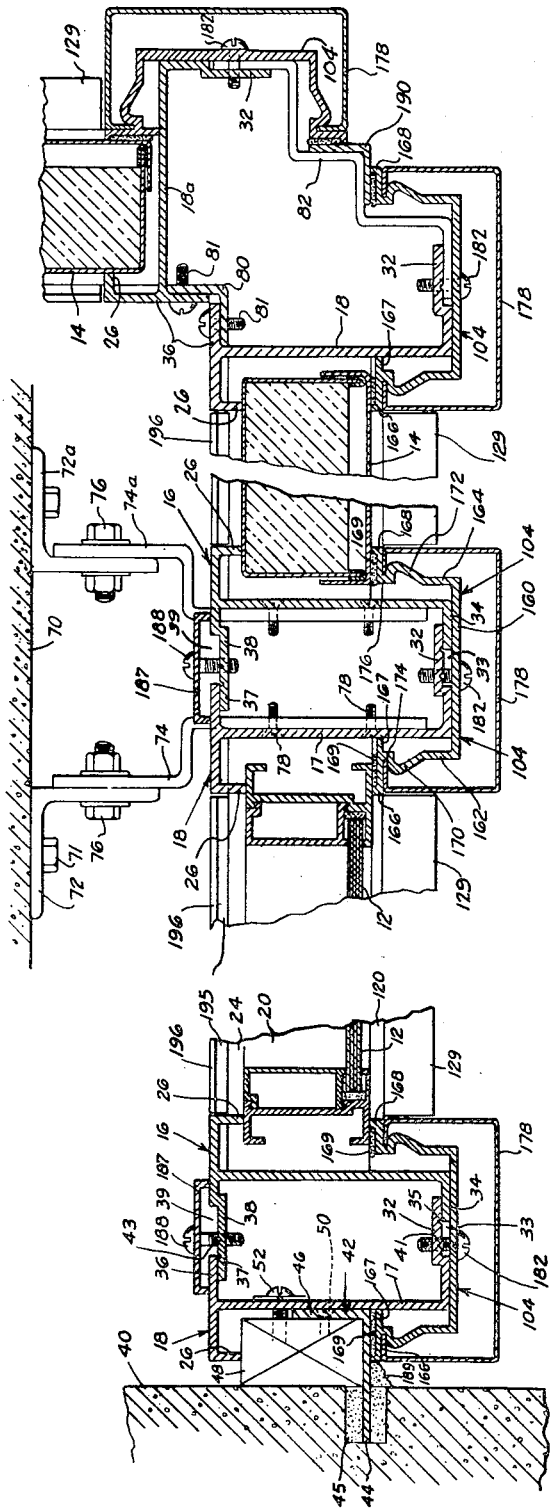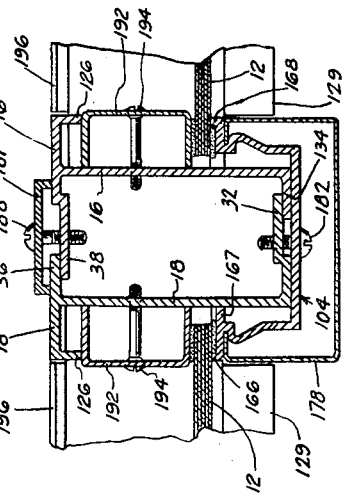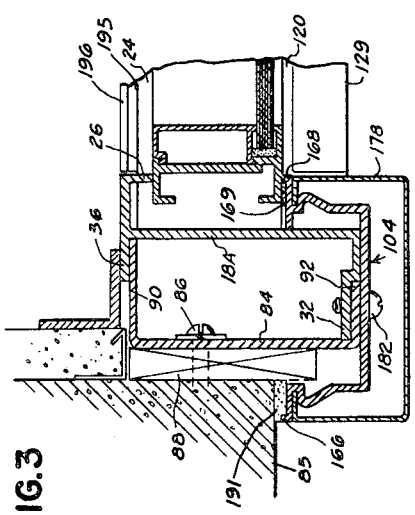

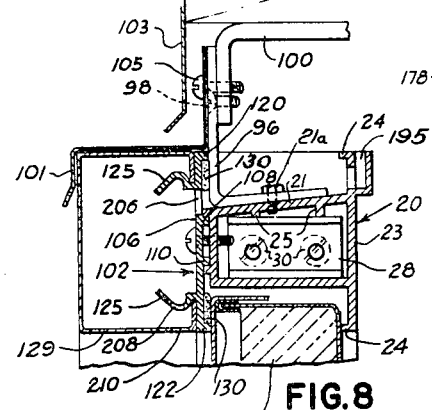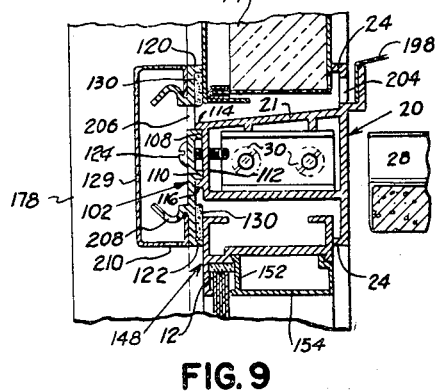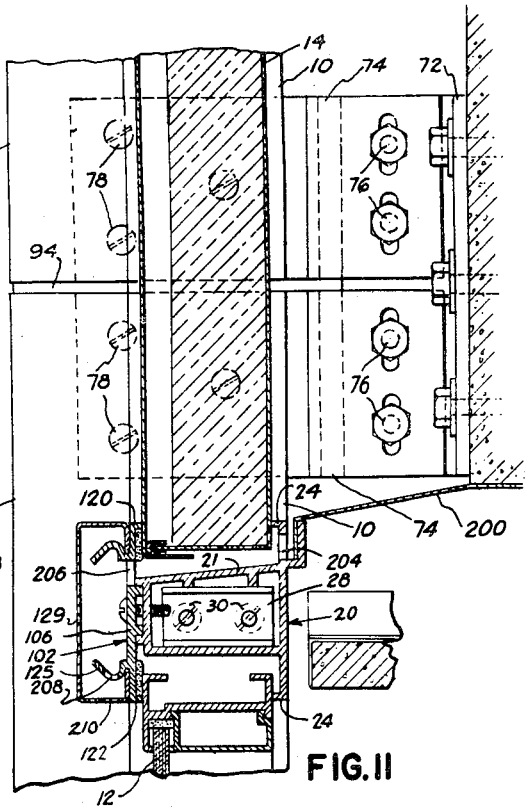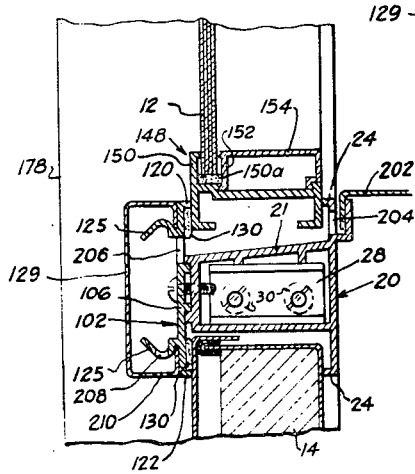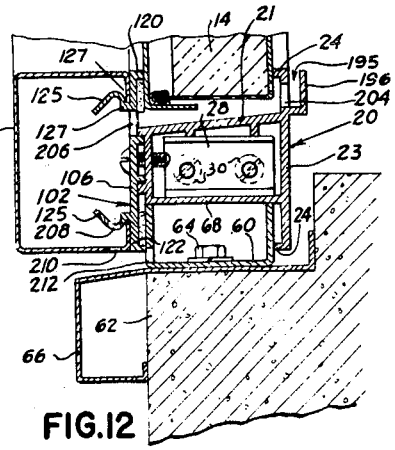

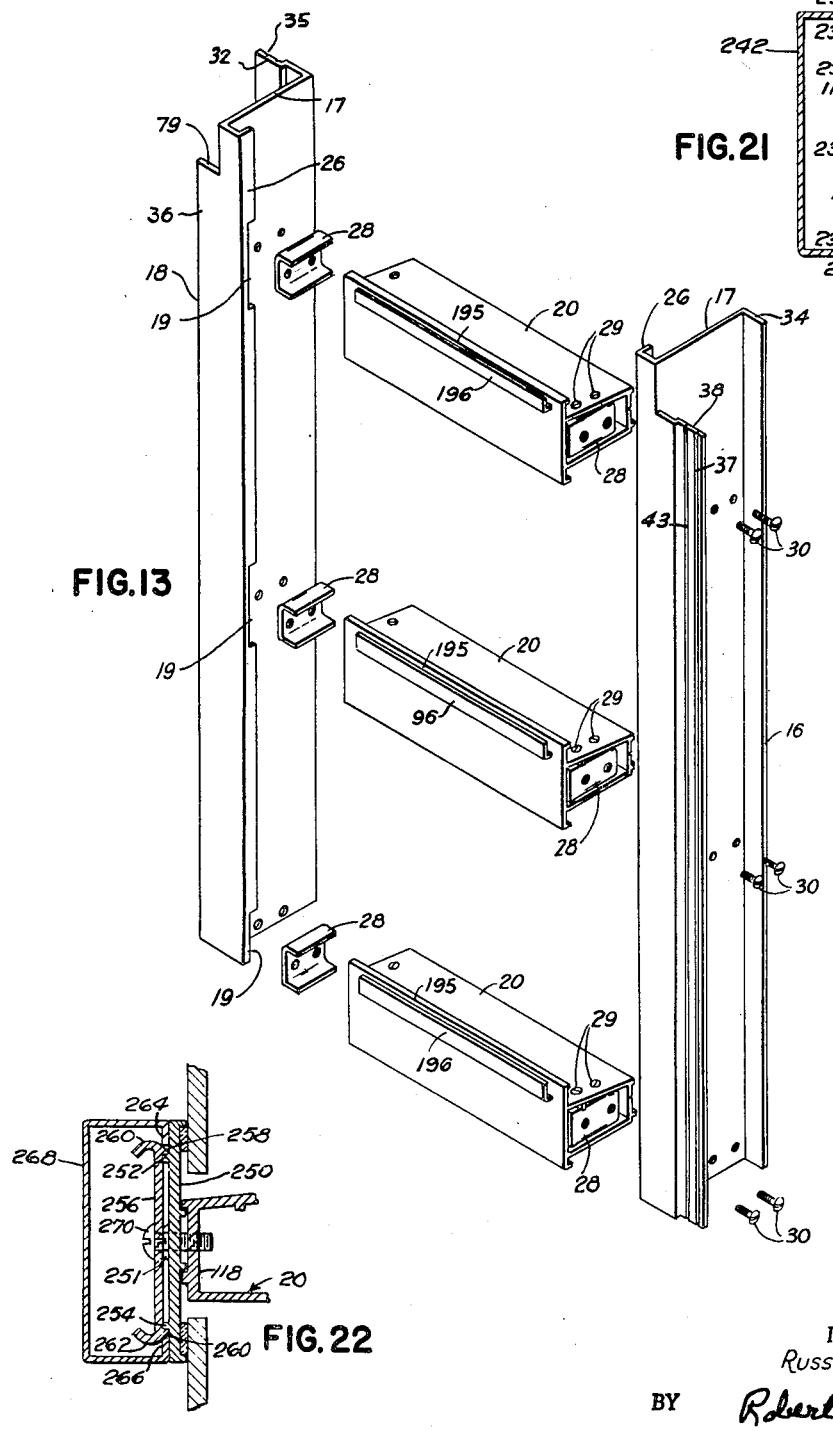

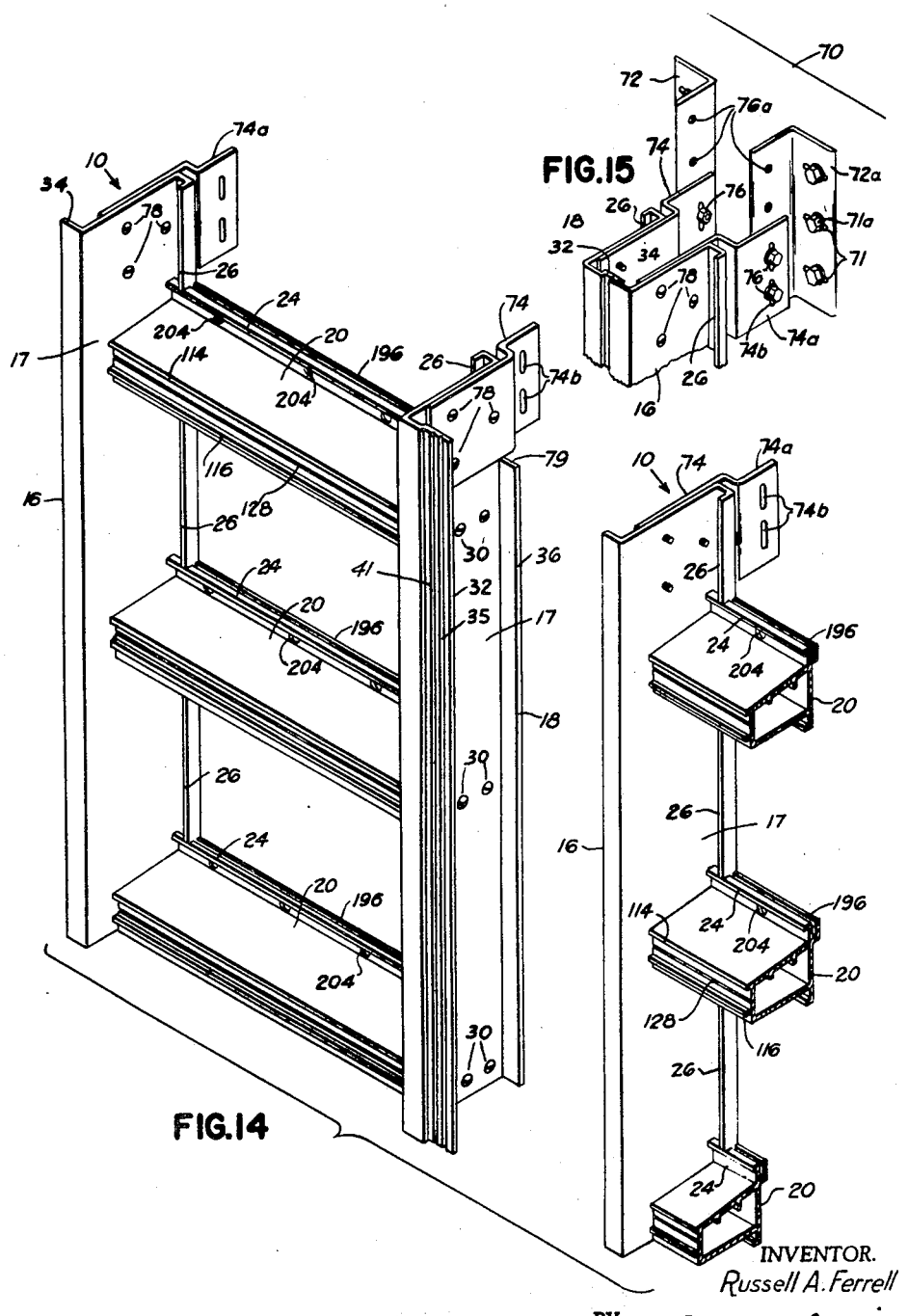

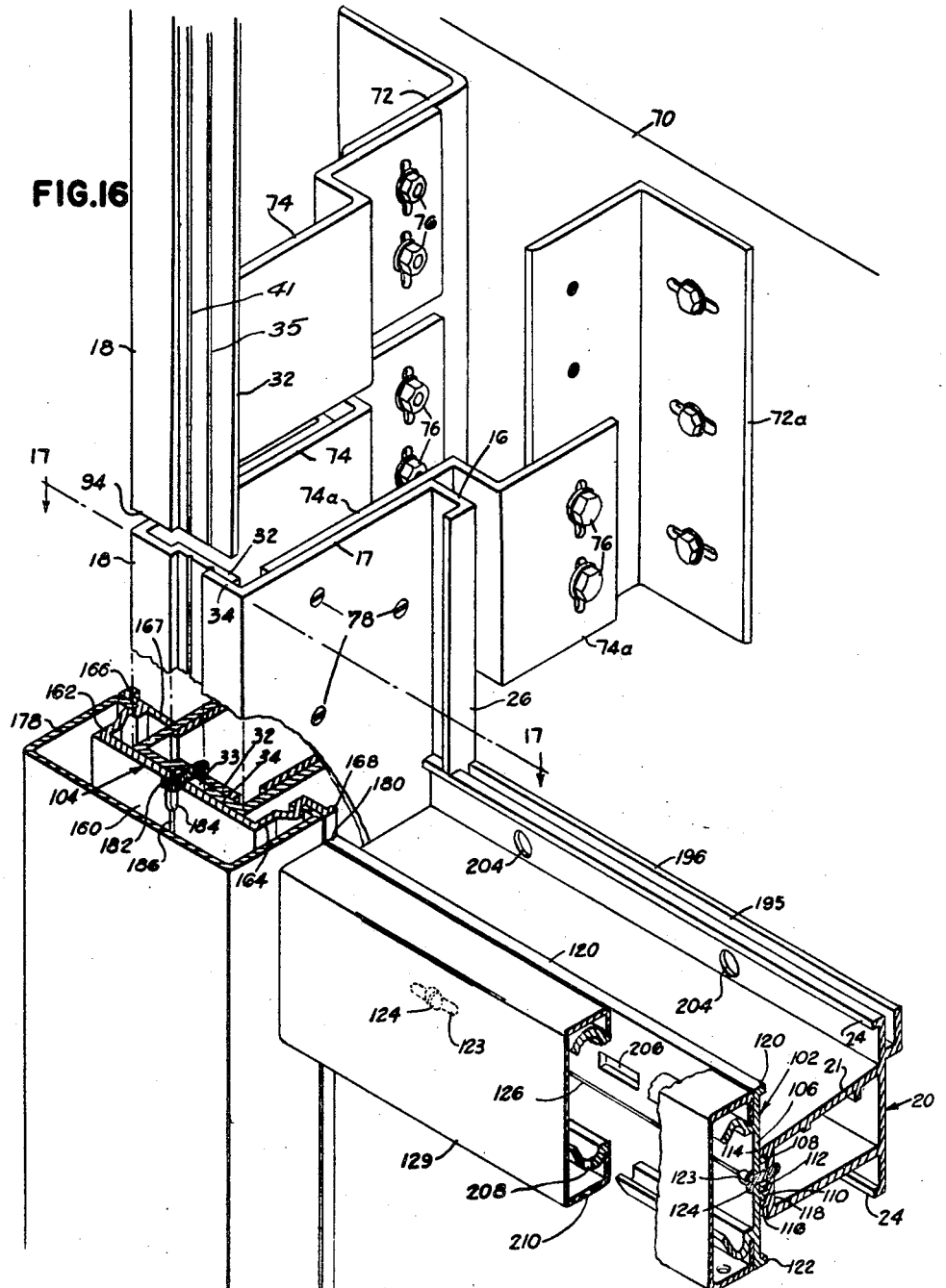

Aug. 23, 1960     R. A. FERRELL     2,949,981
WALL STRUCTURE

Filed Dec. 17, 1957     8 Sheets-Sheet 7

INVENTOR.
Russell A. Ferrell
BY Robert R. Churchill
ATTORNEY

United States Patent Office
2,949,981
Patented Aug. 23, 1960

2,949,981
WALL STRUCTURE
Russell A. Ferrell, Pittsburgh, Pa., assignor to H. H. Robertson Company, Pittsburgh, Pa., a corporation of Pennsylvania
Filed Dec. 17, 1957, Ser. No. 703,356
21 Claims. (Cl. 189—34)

This invention relates to a wall structure.

The invention has for an object to provide a novel and improved wall structure embodying structural frame units for supporting glass and insulated or other panels and in which the frame units and the panels are supported in a novel manner such as to minimize liability of distortion of the frame units or breakage of the panels when the same thermally expand or contract under varying atmospheric conditions.

The invention has for a further object to provide a novel and improved wall structure which is characterized by structure providing substantial freedom and versatility in building design.

A still further object of the invention is to provide a novel and improved wall structure of the character specified which may be economically manufactured and quickly erected and which is further characterized by structure such as to provide a leakproof wall.

With these general objects in view and such others as may hereinafter appear, the invention consists in the wall structure and in the various structures, arrangements and combinations of parts hereinafter described and particularly defined in the claims at the end of this specification.

In the drawings illustrating the preferred embodiment of the invention:

Fig. 1 is a front elevation of a typical wall structure embodying the present invention;

Fig. 2 is a view in vertical cross section taken on the line 2—2 of Fig. 1;

Figure 17:
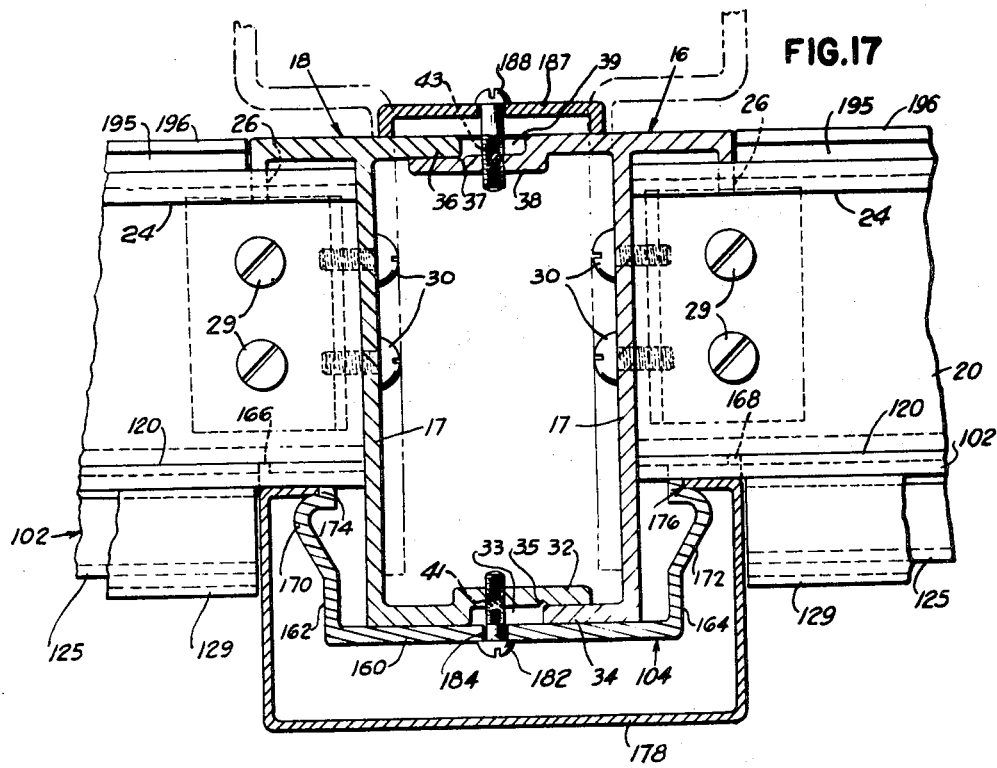
Figure 18:
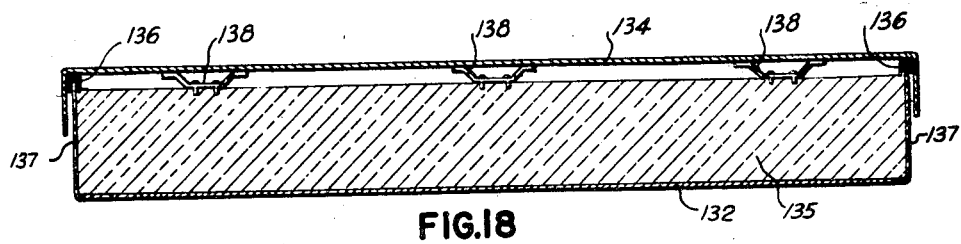
Figure 19:
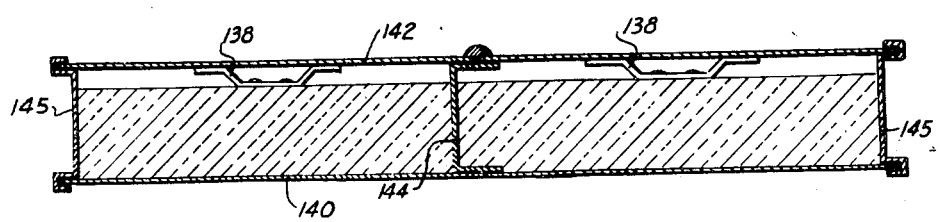
Figure 20:
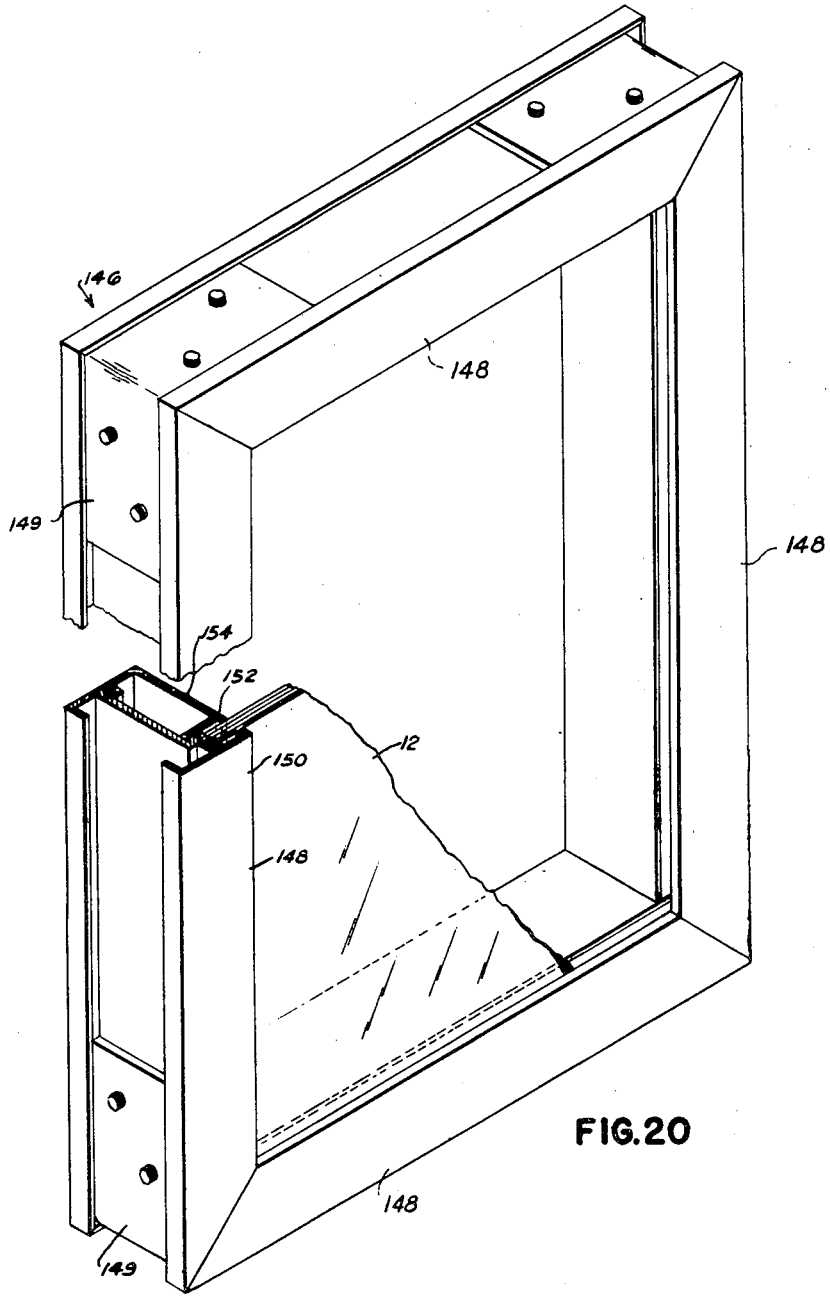

Figs. 3, 4 and 5 are views in horizontal cross section taken on the lines 3—3, 4—4 and 5—5 respectively of Fig. 1;

Fig. 6 is a detail view in horizontal cross section similar to Fig. 3 illustrating a modified form of supporting structure;

Fig. 7 is a detail view in horizontal cross section similar to Fig. 4 illustrating a modified form of glazing structure;

Figs. 8 through 12 are detail views in vertical cross section taken on the lines 8—8 through 12—12 respectively of Fig. 1;

Fig. 13 is a perspective view of an exploded frame unit as seen from the rear or inner face of the unit;

Fig. 14 is a perspective view of adjacent frame units prior to being assembled in cooperating relation as seen from the front or outer face of the unit;

Fig. 15 is a perspective detail view illustrating the upper ends of adjacent units in engaged position and supporting structure therefor;

Fig. 16 is a perspective view showing adjacent frame units supported in operative relation and illustrating the supporting structure for adjacent, vertically aligned sections in a multi-story building;

Fig. 17 is a plan view as seen from the line 17—17 of Fig. 16, some of the parts being shown in section;

Figs. 18 and 19 are views in horizontal cross section of typical insulated panels adapted to be supported in the present frame units;

Fig. 20 is a perspective view partly in cross section of a typical glazing panel or sash frame adapted to be supported in the present frame unit;

Fig. 21 is a vertical cross section detail view of a modified form of a horizontal panel and trim retaining member; and Fig. 22 is a similar view showing a further modified form thereof.

In general the present invention contemplates a novel wall structure for use in the construction of a building and which embodies individual frame units arranged to support building panels, such as glazed and/or insulated or any other type of wall panels. The individual frame units comprise novel extruded metal sections and are preferably preassembled prior to erection from precut lengths of the extruded metal sections, either at the factory or at the building site, whereby to permit rapid and efficient erection of the wall at the site.

In practice the extruded metal sections comprise vertical and horizontal frame members which may be stocked in convenient lengths and cut to the size required for a particular wall structure, thus providing a greater freedom and versatility in the design of the building wall.

In accordance with one feature of the present invention the individual preassembled frame units include vertical extruded frame members of a cross sectional shape such that portions of the vertical members or mullions of adjacent frame units may be erected in overlapping relation one with the other to form in effect a "split" mullion structure, and provision is made for mounting the frame units in a manner such as to permit movement thereof relative to each other upon thermal expansion and contraction, thereby minimizing distortion of the frame structure under varying atmospheric conditions. The present frame structure is also constructed to support building panels in a manner such as to permit relative movement of the panels and their supporting frame units upon such expansion and contraction. The present building wall construction is also arranged to provide a tight and leakproof wall structure in a novel manner, and an efficient drainage system is provided for drainage of any condensation that may form either in the framing system or on the inside of the panels supported therein.

Referring now to the drawings, the present wall structure illustrated in Figs. 1 and 2 is shown as erected to provide a wall in a typical two-story building and includes a plurality of individual frame units indicated generally at 10 secured to the building and arranged to support glazed panels 12 and insulated panels 14. As illustrated in detail in Figs. 13 and 14, each frame unit 10 comprises a plurality of extruded frame members including a left hand vertical frame member 16, a right hand vertical frame member 18 and a plurality of horizontal frame members 20 extended between and secured to the vertical frame members 16, 18. As shown in Figs. 3 and 17, the vertical frame members 16, 18 are substantially T-shaped in horizontal cross section at their inner ends and substantially L-shaped in horizontal cross section at their outer ends, the inner ends being provided with outwardly projecting marginal flange portions 26 for engagement with the inner marginal faces of the building panels supported therein. The flange portions 26 may be notched at spaced intervals, as indicated at 19 in the perspective view, Fig. 13, illustrating the rear of a frame unit 10, the notches being arranged to receive the ends of the horizontal frame members 20.

The horizontal frame members 20, as illustrated in Fig. 8, comprise hollow members substantially rectangular in cross section, the upper wall 21 thereof being arranged at a slight downward and outward incline, as shown, and the inner wall 23 is provided with upper and lower vertical extensions, each having an outwardly projecting marginal flange portion 24 for engagement with the inner faces of the panels supported therein. In order to assemble the horizontal members 20 and the vertical members 16 and 18, the hollow ends of the horizontal members 20 are first provided with U-shaped anchoring members 28, Fig. 13, with the legs of the U extended inwardly to present the closed end face of the U in a position spaced a short distance inwardly from the adjacent end of the horizontal member. It will be observed that the horizontal member 20 is provided with ribbed portions 25, Fig. 8, depending from the underside of the upper wall 21 thereof to provide bearing portions for the upper legs of the U-shaped anchoring members 28. The anchoring members 28 may be secured to the horizontal member 20 by flat-headed self-tapping screws 29, as shown in Fig. 13, and the ends of the horizontal members 20 are then placed in opposed notched portions 19 of the vertical members and secured to the legs 17 of the vertical frame members 16, 18 by round-headed self-tapping screws 30 to produce the frame structure shown in perspective in Fig. 14, which view illustrates the front of the frame unit 10 wherein the marginal flanged portions 26, 24 of the vertical and horizontal members respectively present a continuous, substantially rectangular, upstanding wall portion for engagement with the inner marginal face of a panel supported therein. The disposition of the U-shaped anchoring member 28 in a position spaced slightly inwardly relative to the ends of the horizontal member 20 permits the ends of the horizontal member 20 to be tightened against the vertical leg portions 17 in flush relationship.

It will be observed in Figs. 3 and 4 that the cross sectional shape of the left-hand vertical member 16 is in substantially reverse relation to the cross sectional shape of the right-hand vertical member 18, the vertical leg 32 of the L-shaped end of the right-hand member 18 extending to the right and the leg 34 of the left-hand member 16 extending to the left, one of the legs 32 being offset for cooperating overlapping engagement with the other leg 34 of adjacent frame units at the front face thereof. Likewise, the adjacent vertical legs 36, 38 of the T-shaped end of adjacent frame units are arranged to overlap at the rear face thereof as shown.

As illustrated in Fig. 3, in the erection of the wall a length of a right-hand frame piece 18 may first be secured to the vertical supporting column or adjacent side wall 40 of the building structure in a manner such as to provide a substantially leakproof joint. In the embodiment of the invention shown in Fig. 3 an elongated angle member 42 is first secured to the side wall 40 by cementing or otherwise securing one leg 44 of the angle member in a recessed portion 45 of the side wall, the other leg 46 of the angle member being secured to an elongated shim piece 48 by flat-headed screws 50. The shim piece 48 may be cut and fitted to the wall 40 to provide a vertically plumbed inner face against which the frame piece 18 may be aligned and secured. The vertical leg 17 of the right-hand frame piece 18 may then be secured to the assembled shim piece 48 by round-headed screws 52 with the flange portion 26 thereof in engagement with the inner face of the shim piece 48 as shown.

An assembled frame unit 10 may now be erected with the left-hand vertical frame member 16 of the assembled frame unit disposed in cooperating engagement with the vertical frame piece 18 thus supported on the side wall 40. As illustrated in Fig. 3, the frame unit is placed with the inner vertical legs 36, 38 of the T-shaped portions of the adjacent frame members in overlapping relation and with the outer vertical legs 32, 34 of the L-shaped portions of the adjacent frame members in overlapping relation. It will be observed that the overlapping portions of the legs 36, 38 provide a space 39 between the offset portion of the leg 38 and the end of the leg 36, and likewise, the overlapping portions of the legs 32, 34 provide a space between the offset portion of leg 32 and the end of the leg 34 to thereby enable the assembled frame units to move laterally relative to one another upon any expansion and contraction thereof. Such provision for lateral movement also provides ample tolerance for initial lateral adjustment of the frame unit during assembly.

In order to assure an initial predetermined nominal spacing between the offset portions and the ends of the legs, as indicated at 33, 39 respectively, the leg 32 may and preferably will be provided with a longitudinally extended extruded notched portion 35 for use as a vertical guide against which the end of the leg 34 may be initially aligned, and likewise, the leg 38 may be provided with a similar extruded notched portion 37 for use as a vertical guide against which the end of the leg 36 may be aligned. Similar notches 41, 43, spaced from the notches 35, 37 respectively, may also be provided as guide lines for fastening screws as will be hereinafter described.

The lower end of the frame unit 10 terminating in a horizontal frame member 20 is preferably supported on a U-shaped sill anchor 60 comprising a channel forming in effect a track upon which the unit may slide, as shown in detail in Fig. 12, and which may be secured to the sill 62 by bolts 64 on top of an underlying sill flashing member indicated at 66. As herein shown, the lower wall 68 of the horizontal member 20 is seated upon the tops of the legs of the U-shaped sill anchor 60, and the lower flange portion 24 of the horizontal frame member 20 is aligned and in engagement with the face of the rear leg of the U.

Referring now to Fig. 4, the right-hand vertical frame member 18 of the assembled frame unit may be secured at its upper end to the masonry indicated at 70 at the second floor by spandrel anchors which may vary in shape and size in accordance with building conditions. A typical supporting structure, herein shown, includes an angle member 72 provided with horizontal slots 71, Fig. 15 and bolted at 71a to the masonry 70 and an offset spandrel anchor 74 provided with vertical slots 74b at one end and secured to the extended legs of the angle members 72 by bolts 76 extending through vertically spaced holes 76a in said legs. The other end of the offset anchor 74 is secured to the vertical leg 17 of the frame member 18 by flat-headed screws 78. It will be observed that the upper end of the frame member 18 may be notched as indicated at 79 to receive the anchor 74 as shown in Fig. 14. The horizontal and vertical slots 71a and 74b in the anchor members 72, 74 respectively permit the frame units to be initially adjusted to assure proper vertical and horizontal alignment. While the outwardly extended offset anchor 74 provides a rigid support for the upper end of the frame unit the outward extension thereof provides sufficient flexibility to permit lateral expansion and contraction of the frame unit relative to an adjacent and similarly supported frame unit as shown in Fig. 4.

After the first frame unit 10 has been erected, as above described, a second and similar frame unit may be erected to rest on top of the sill anchor or track 60 and then moved laterally to present adjacent vertical frame members 16, 18 in cooperating overlapping engagement, as shown in Fig. 4, and the upper end thereof may be similarly supported by corresponding spandrel anchors 72a and 74a, succeeding frame units being erected in the same manner to form a wall structure across the face of the building.

The corner structure shown in Fig. 5 may include an elongated angle member 80 secured by screws 81 to the legs 36 of adjacent frame members 18, 18a arranged at right angles to each other, as shown, and a plurality of stepped and spaced right-angle strap members 82 arranged to cooperate with the offset legs 32 of adjacent frame members 18, 18a of the corner structure. It will be observed that the vertical frame member 18a comprises an inverted form of vertical frame member 18 at the corner structure.

A modified form of supporting structure for the left-hand edge of the first erected frame unit is illustrated in Fig. 6 wherein a vertical elongated channel member 84 is secured to the masonry 85 of an adjacent column or wall by bolts 86 with an intervening shim piece 88. The inner leg 90 of the channel member is of a length such as to cooperate with the leg 36 of an inverted frame member 18A, and the outer leg 92 of the channel is of a shorter length such as to cooperate with the offset leg 32 of the inverted frame member 18A. An angle iron 93 cooperating with panel 93a and leg 36 is provided for frictionally retaining leg 36 between iron 93 and leg 90 of the member.

Referring now to Figs. 8, 9, 11, and 16, the upper frame units 10 for the second story of the two-story building, herein illustrated, may be erected in vertical alignment with the units erected at the first floor, the lower ends of the upper frame units being supported by spandrel anchors 72, 74 in a manner similar to the spandrel supporting structure for the upper ends of the lower frame units. It will be observed that the upper frame units 10 are initially erected to provide a predetermined nominal space 94, Figs. 11 and 16, between the ends of the upper and lower frame units to provide a clearance for any relative vertical expansion and contraction. The upper end of the upper frame unit 10, which terminates in a horizontal frame member 20, may be supported by angle straps 96, Fig. 8, a horizontal leg of which is secured to the upper inclined wall 21 of the frame member 20 by screw 21a, and the vertical leg thereof being secured by flat-headed screws 98 to a bracket 100 attached to the roof of the building as shown. A flashing member 101 may be secured by screws 105 to the angle straps 96 and the bracket 100 to extend over the top of the outer face of the wall structure, and a suitable capping member 103 may be extended along the edge of the roof as shown.

As herein shown, the panel members 12, 14 are secured to the frame units by horizontal and vertical retaining members 102 (Figs. 8 to 12 and 16), 104 (Figs. 3 to 7), respectively which may also comprise extruded metal members. The horizontal retaining members 102 (see Fig. 16), as herein illustrated, are of a cross sectional shape such as to provide a flat vertical wall portion 106 having spaced inwardly extended tongue portions 108, 110 arranged to fit into a groove portion 112 defined by spaced projections 114, 116 in the front wall 118 of the horizontal frame member 20. The upper and lower edges of the retaining member 102 are provided with inwardly extended marginal retaining flanges 120, 122, as illustrated, for cooperating engagement with the outer marginal faces of the panels retained thereby, the upper flange 120 being arranged to engage the lower marginal edge of a panel 14 supported above the horizontal frame member 20, and the lower flange 122 being arranged to engage the upper end of a panel 12 supported below the horizontal member 20, as shown in Fig. 9. Each horizontal retaining member 102 is provided with spaced horizontally extended slots 123 (Fig. 16), and in assembling the retaining member 102 with the horizontal frame member 20, holes may be drilled in the front wall 118 in alignment with the slots 123, and the retaining member 102 secured to the front wall by self-tapping round-headed screws 124 extended through the slots and fastened in the drilled holes. In order to provide a guide line for preforming the slots 123, the outer face of the retaining member 102 may be provided with an extruded notch portion 126, and a similar extruded notch 128 may be provided in the front wall 118 of the horizontal frame member 20 to facilitate and assure proper alignment of the slots and the drilled holes.

The insulating panels 12, 14 may and preferably will be of a predetermined thickness adapted to fit between the marginal flange portions 24 of the horizontal frame member 20 and the marginal flange portions 120, 122 of the retaining member 102. In practice an extruded plastic caulking material, indicated at 130 (Figs. 8 to 12), is placed between the outer marginal face of the panel and the retaining member in the recesses defined by the flange portions 120, 122 to provide a leakproof seal as shown. Where the horizontal retaining member 102 occurs at the upper end of a frame unit, as shown in Fig. 8, the upper marginal retaining flange 120 may engage the supporting structure, herein illustrated as comprising the angle members 96. In Fig. 9, the horizontal retaining member 102 is shown with the upper marginal flange 120 in engagement with an insulating panel 14 and with the lower marginal flange 122 in engagement with the sash frame of a glazing panel 12. In Fig. 12, the lower marginal flange portion 122 is arranged to engage the front leg of the U-shaped sill anchor 60 as shown. The front face of the horizontal retaining member 102 may be provided with curved extrusions 125 defining with the wall portion 106 grooves 127 for receiving the inwardly turned edges of horizontal snap-in trim members 129.

Typical insulating panel members 14 are illustrated in Figs. 18 and 19. The insulating panel member shown in Fig. 18 comprises inner and outer facing members 132, 134 respectively provided with a thickness of insulating material 135 therebetween, which may comprise any preferred type found on the market as shown. The inner facing member 132 is designed to contain the insulating board, and the outer facing member 134 is fitted over the upstanding edges 137 of the inner facing member 132 and provided with preferably a vinyl seal 136. Spacer clips 138 may be provided between the inner face of the outer facing sheet 134 and the insulating material 135, as shown, to provide an air space between the insulation and the outer facing member. The insulating panel member shown in Fig. 19 includes inner and outer facing sheets 140, 142, respectively, held in spaced relation by an intermediate spacer channel 144 and edging channels 145. Similar spacer clips 138 may be provided between the outer facing sheet and the insulation to provide an air space therebetween. Suitable vent and drainage holes may be formed in the sides and bottom edges of the panels for communication with the air space and to allow condensation to escape and drain into the drainage system for the frame units, as will be later described.

A typical glazing panel 12 is illustrated in Fig. 20 and includes a sash frame indicated at 146 comprising extruded metal sections 148 assembled to form a rectangular frame unit and held in assembled relation by corner angle members 149 as shown. The sash frame 146 may and preferably will be of a thickness to fit between the supporting frame flanges 24 (Figs. 9 and 10) and the retaining member flanges 120, 122. The edges of the glass panel may be set in a glazing compound 150a provided at the lower end of a socket defined by the outer wall portion 150 of the sash frame and a wall 152 of a snap-in spacing and retaining member 154 as illustrated. The glazing panel illustrated in Fig. 20 is designed to permit the glass to be set from the inside of a building. In lieu of the corner brackets 149, the mitered corners of the frame unit may be welded if desired.

In practice the insulating panels 14 and also the sash frames 146 may be conveniently assembled with the individual frame units 10 prior to erection thereof, the panels and the sash frames being retained in assembled relation therewith by the horizontal retaining members 102 which may also be assembled with the frame units prior to erection thereof. The horizontal retaining members 102 may preferably be of the same length as the horizontal frame members 20 extending between the vertical frame members 16, 18. When thus assembled, the bottom of the lower frame units provide a channel defined by opposed marginal flange portions 24, 122 which may be placed over the sill anchor 60 in assembly as shown in Fig. 12.

The vertical retaining and frictional clamping unit 104 for members 16, 18 may be assembled with the frame units 10 after erection thereof and with the panels and horizontal retaining members assembled in the frame units. As shown in Fig. 4, the extruded vertical retaining members 104 are provided with a front wall 160, side walls 162, 164 and laterally extended flange portions 166, 168 disposed at the inner ends of the side walls 162, 164. The side walls 162, 164 are also provided with outwardly curved extrusions 170, 172 defining with the outer faces of the flange portions 166, 168, grooves 174, 176 for receiving the inwardly turned edges of vertical snap-in trim members 178. In practice the end portions of the curved extrusions 125 formed on the horizontal retaining member 102 may be cut back a distance sufficient to provide a clearance for the vertical trim member 178, as shown in Fig. 17, and the flange portions 166, 168 of the vertical retaining member 104 may be notched, as indicated at 180 (Fig. 16), to fit over the extended flange portions 120, 122 of the horizontal member, thus presenting the vertical flange portions 166, 168 in alignment with the horizontal flange portions 120, 122 and providing a continuous rectangular upstanding wall portion for engagement with the outer marginal face of the panel supported thereby. The inner faces of the flange portions 166, 168 provide recesses for receiving preferably an extruded plastic caulking compound 169 (Fig. 9) to provide a leakproof seal between the flange portions and the vertical marginal faces of the panels retained thereby.

As herein illustrated, the vertical retaining members 104, Fig. 16, are secured to the legs 32 of the vertical frame members 18 by self-tapping round-headed screws 182. The vertical retaining members 104 may be provided with spaced vertical slots 184 prior to erection thereof and, as shown, the front wall 160 thereof may be provided with an extruded V groove 186 to form a guide line along which the slots 184 may be cut. The vertical center line of the slots 184 is preferably disposed slightly off center with relation to the true center line of the retaining member 104 so as to dispose the fastening screws 182 within the space 33 between the beginning of the offset portion of the leg 32 and the end of the leg 34, and in order to initially align the vertical retaining member 104 in a position to present the slots in alignment with such space, the flange portion 166 of the left-hand side wall 162 is provided with an inward extension 167 for engagement with the vertical leg 17 of the frame member 18 as shown. When thus aligned, holes may be drilled in the leg 32 in alignment with the slots 184, and the self-tapping screws 182 may be extended through the slots and fastened in the drilled holes. The drilled holes in the leg 32 will occur along the extruded guide line 41 (Fig. 3). The inner face of the cooperating vertical frame members 16, 18 of the wall structure may then be provided with an elongated U-shaped inner closure member 186 of extruded metal which may be attached to the leg 38 of the vertical frame member 16 by self-tapping screws 188, the screws 188 being extended through the space 39 between the beginning of the offset portion of the leg 38 and the end of the leg 36 as shown. The fastening holes in the leg 38 will occur along the extruded guide line 43.

As thus assembled, it will be seen that adjacent frame units 10 are retained in frictionally clamped relationship between the vertical retaining member 104 at the outer face of the wall structure and the closure member 186 at the inner face of the wall structure, the retaining member 104 being secured to the leg 32 of the frame member 18, and the closure member 187 being secured to the leg 38 of the frame member 16, so that adjacent frame units are frictionally held in assembled relation, the spaces 33, 39 providing ample clearance for the fastening screws to allow relative movement of the overlapping leg portions 32, 34 and 36, 38, and relative lateral movement of adjacent frame units upon expansion and contraction thereof.

It will be apparent that the vertical front retaining member 104 and the closure member or rear retaining member 187 will move with the frame unit to which it is secured during thermal expansion and contraction. It will also be observed that vertical expansion and contraction of the frame units is afforded by virtue of the overlapping arrangement of the frame members 16, 18, the manner of fastening the retaining elements to different frame members on the inner and outer faces of the wall structure and also by virtue of the spacing 94 between the upper and lower ends of vertically aligned frame units in a multi-story building. It will be further observed that the building panels 12, 14 frictionally clamped between the flange portions of the frame units and the flange portions of the horizontal and vertical retaining members are also capable of lateral and longitudinal expansion and contraction relative to the frame units.

In the structure illustrated in Fig. 3, where the left-hand flange portion 166 engages the structural angle member 46, an extruded plastic caulking 169 may be provided between the flange portion and the angle member, and the space between the outer edge of the flange portion 166 and the adjacent masonry wall 40 may also be provided with a caulking compound 189, as shown, to provide a leakproof wall structure.

In the modified form of supporting structure shown in Fig. 6, wherein the left-hand flange portion 166 engages the corner of the masonry wall 85, a relatively thick layer of caulking compound 191 may be provided between the recessed portion of the flange and the corner of the masonry, as shown. In Fig. 4 the opposed flange portions 166, 168 of the vertical retaining member 104 are shown in engagement with the marginal face of a sash frame of a glazed panel 12 and with the marginal face of an insulating panel 14 respectively. At the corner structure, shown in Fig. 5, the marginal flange portions of the vertical retaining members engage adjacent insulating panels 14 on one side and engage the adjacent faces of an angle member 190 on the other side. The angle member 190 may be secured to the strap members 82 at the corner as shown. It will be noted that the self-tapping screws 182 which mount the retaining members 104 are utilized to hold the straps 82 in place.

The structure illustrated in Fig. 7 comprises a modified form of glazing structure adapted to be glazed from the outside face of the wall. As therein shown, the spaces between the inner retaining flanges 126 and the glass panels 12 may be provided with a U-shaped filler piece 192 secured to the adjacent vertical frame members 16, 18 by screws 194, the glass being inserted between the filler piece and the adjacent retaining flanges 166 or 168 and set therein by a caulking compound 169 as shown.

It will be observed that the structure of the retaining flanges 120, 122 of the horizontal retaining members 102 and the flanges 166, 168 of the vertical retaining and frictional clamping member 104 provide rabbeted recesses into which the caulking compound 169 is inserted for engagement with the building panels to be supported, the outer edges of the flanges engaging the face of the panels so that the cauling compound is concealed and protected from the elements and the harmful rays of the sun, in addition to providing a neat and attracted leakproof structure.

Referring now to Figs. 8 to 12, as therein shown, a drainage system is provided forming a drainage path from the interior of the wall structure through to the exterior thereof, and which is arranged so that any water formed by condensation on the interior surfaces of the framing system or the interior face of the wall structure will drain to the exterior of the wall. Each horizontal frame member 20 is provided with a channel portion or trough 195 defined by a horizontally extended extrusion 196 along the upper edge of the rear wall 23 thereof. The channel 195 is arranged to receive the edges of flashing members 198 (Fig. 9), 200 (Fig. 10) extended from the masonry of the roof and second floor beams, as shown, and is also arranged to receive the downwardly turned marginal edges of window stools or connector boxes 202 provided at each floor as shown in Fig. 2. Condensation from the inside wall will accumulate in each channel portion 195 and pass through weep holes 204 formed in the rear wall 23 and then downwardly over the inclined surface of the upper wall 21. The water may then pass through weep holes 206 cut in the wall portion 106 of the horizontal retaining member 102 and into a channel portion defined by the lower curved extrusion 125, the latter being provided with weep holes 208 to permit the water to pass into the trim member 129 and out to the exterior of the structure through weep holes 210 formed in the trim member. As shown in Fig. 12, drainage weep holes 212 may be provided in the front leg of the U-shaped sill anchor 60. It will be observed that the ends of the extruded portion 196 defining the channel 195 are required to be cut back to fit against the marginal flange portions 26 of the vertical frame members 16, 18 in assembly as indicated in Fig. 17.

As illustrated in Fig. 21, a modified form of panel retaining and snap-on trim holding structure, shown as applied to a horizontal frame member 20, may comprise a separate elongated panel retaining member 220 of extruded metal having spaced, inwardly extended tongue portions 222 for cooperation with the groove portion defined by the spaced projections 114, 116 in the front wall 118 of the frame member 20. The upper and lower edges of the member 220 are provided with marginal retaining flanges 224, 226 for cooperating engagement with the marginal portions of the panels 228 retained thereby. Caulking material 229 is placed between the panel and the retaining member to provide a leakproof seal as shown. The front face of the member 220 is flat, and a separate, resilient retaining clip 230 may be secured to the retaining member 220 and to the front wall 118 of the frame member by self-tapping round-headed screws 232. The retaining clip 230 may comprise flat sheet metal outwardly curved along its opposed upper and lower marginal edges 234, 236, which comprise in effect spring clips over which the inwardly turned edges 238, 240 of the trim member 242 may be snapped for detachably holding the trim member 242 in place as shown. In practice a plurality of relatively short retaining clips 230 may be arranged in spaced relation along the elongated frame member 20 for cooperation with the elongated trim member 242 if desired. While the modified structure is shown as applied to the horizontal frame member, it will be apparent that a similar modified construction may be applied to the vertical retaining structure.

A further modified form of panel and trim retaining structure, as illustrated in Fig. 22, may comprise a separate panel retaining member 250 secured to the front wall 118 of the frame member 20 by self-tapping round-headed screws 251. The inner face of the member 250 is provided with projecting portions for cooperation with the front face of the frame member 20 and for cooperating engagement with the marginal portions of the panels, similar to that shown in Fig. 21. The outer face of the retaining member 250 is provided with outwardly projecting spaced tongues 252, 254 for cooperation with a recessed portion in the rear face of an extruded trim retaining member 256, the recessed portion being defined by spaced projections 258, 260 from the rear face. The upper and lower marginal edges of the trim retaining member 256 are provided with extruded curved portions 260, 262 for cooperating engagement with the turned-in edges 264, 266 of an elongated trim member 268. A plurality of relatively short trim retaining members 256 may be arranged in spaced relation and secured to the panel retaining member 250 by self-tapping screws 270.

From the above description it will be seen that the present invention provides a novel wall structure embodying individual frame units for supporting building panels and is erected in a manner such as to permit thermal expansion and contraction of the frame units relative to each other, whereby to prevent distortion or breakage of the parts and also to compensate for building tolerances which may be encountered during erection of the walls. The overlapping leg portions of adjacent frame units are mounted to provide at least five-sixteenths inch relative lateral movement, and the spacing between vertically aligned units may be at least one-quarter of an inch to compensate for vertical thermal expansion and contraction. In practice the extruded metal members may and preferably will comprise extruded aluminum with a minimum wall thickness of one-eighth of an inch to provide a rigid and lightweight wall structure. The supporting and fastening elements may be of stainless steel or other non-corrosive metal, and the provision of concealed caulking in the panel retaining elements to provide an attractive, leakproof and highly efficient wall structure. The adjustable features of the present wall structure also enable the wall to be used with advantage to cover curved building surfaces wherein the distance to be covered by the wall is greater than that of a comparable straight surface. The overlapping portions of the adjacent frame units may be laterally expanded to compensate for such increased distance, thereby permitting the wall to be erected efficiently without the need of mitering or other additional fabrication.

An important advantage of the present wall structure resides in the versatility of the design of the structure which factor enables the architect to specify variations in the spacing of the vertical and horizontal members of the frame units and variations in the kind and size of panels as required without being restricted to modular units. In practice the wall structure may be provided with conventional operating sash, not shown, and the panels and trim may comprise different materials and colors as desired.

While the preferred embodiment of the invention has been herein illustrated and described, it will be understood that the invention may be embodied in other forms within the scope of the following claims.

Having thus described the invention, what is claimed is:

1. A wall structure comprising a plurality of individual frame units which support building panels, each frame unit including vertical and horizontal frame members, and means mounting adjacent frame units and permitting relative movement upon thermal expansion and contraction thereof, said mounting means including means independently supporting adjacent individual frame units from the building structure and further including a laterally extended portion from each unit arranged in overlapping engagement with an adjacent unit, and retaining means frictionally engaging the overlapping portions of adjacent units and secured to one of the overlapping portions of one unit to effect clamping of the overlapping portion of an adjacent unit thereto.

2. A wall structure comprising a plurality of individual frame units which support building panels, each frame unit including vertical and horizontal frame members, and means mounting adjacent frame units and permitting relative movement upon thermal expansion and contraction thereof, said mounting means including means independently supporting adjacent individual frame units from the building structure and further including a laterally extended portion from each unit arranged in overlapping engagement with an adjacent unit, retaining means frictionally engaging the overlapping portions of adjacent frame units and secured to one of the overlapping portions of one unit to effect clamping of the overlapping portion of an adjacent unit, said frame members having rear flange portions and said retaining means having front flange portions, and building panels frictionally retained between said front and rear flange portions, thus permitting relative thermal expansion and contraction of the panels and the frame units.

3. A wall structure comprising a plurality of individual frame units which support building panels, each frame unit including vertical and horizontal frame members, and means mounting adjacent frame units and permitting relative movement upon thermal expansion and contraction thereof, said mounting means including means independently supporting adjacent individual frame units from the building structure and further including a laterally extended portion from each unit arranged in overlapping engagement with an adjacent unit, retaining means frictionally engaging the overlapping portions of adjacent frame units and secured to one of the overlapping portions of one unit to effect clamping of the overlapping portion of an adjacent unit, and fastening means securing each individual frame unit to the building structure, said fastening means permitting the units to move relatively independently of each other upon thermal expansion and contraction of adjacent frame units.

4. A wall structure comprising a plurality of individual frame units which support building panels, means independently supporting adjacent individual frame units from the building, each frame unit including vertical and horizontal frame members, said vertical frame members having laterally extended marginal leg portions, the legs of adjacent frame units being arranged in overlapping engagement with each other, and retaining means frictionally engaging the overlapping legs of adjacent units and secured to one of the legs of one unit to effect clamping engagement of the leg of the adjacent unit, said retaining means permitting relative movement of adjacent frame units upon thermal expansion and contraction thereof.

5. A wall structure comprising a plurality of individual frame units which support building panels, means independently supporting adjacent individual frame units from the building, each frame unit including vertical and horizontal frame members, said vertical frame members having laterally extended front and rear marginal leg portions, the legs of adjacent frame units being arranged in overlapping engagement, and a vertical retaining member frictionally engaging the overlapping legs of adjacent frame units, said retaining member being secured to a leg of one frame unit and engaging the other leg to effect frictional clamping of the overlapping leg of the adjacent frame unit thus permitting relative movement of adjacent frame units upon thermal expansion and contraction thereof.

6. A wall structure comprising a plurality of individual frame units which support building panels, means independently supporting adjacent individual frame units from the building, each frame unit including vertical and horizontal frame members, said vertical frame members having laterally extended front and rear marginal leg portions, the legs of adjacent frame units being arranged in overlapping engagement, and front and rear vertical retaining members frictionally engaging the overlapping legs of adjacent frame units, one retaining member being secured to the front leg of one frame unit, the other retaining member being secured to the rear leg of the adjacent frame unit thereby clamping of the overlapping legs of adjacent frame units, thus permitting relative movement of adjacent frame units upon thermal expansion and contraction thereof.

7. A wall structure comprising a plurality of individual frame units which support building panels, means independently supporting adjacent individual frame units from the building, each frame unit including vertical and horizontal frame members, said vertical frame members having laterally extended front and rear marginal leg portions, the legs of adjacent frame units being arranged in overlapping engagement, a retaining member frictionally engaging the overlapping front legs of adjacent frame units and secured to a front leg of a first frame unit to effect clamping engagement of the overlapping front leg of the second frame unit, and a rear closure member frictionally engaging the overlapping rear legs of adjacent frame units and secured to a rear leg of the second frame unit to effect clamping of the overlapping rear leg of the first frame unit, thus permitting relative movement of adjacent frame units upon thermal expansion and contraction thereof.

8. A wall structure comprising a plurality of individual frame units which support building panels, means independently supporting adjacent individual frame units from the building, each frame unit including vertical and horizontal frame members, said vertical frame members having laterally extended front and rear marginal leg portions, the legs of adjacent frame units being arranged in overlapping engagement with each other, a vertical retaining member frictionally engaging the overlapping legs of adjacent frame units, said retaining member being secured to the front leg of one frame unit to effect clamping of the overlapping legs of adjacent frame units, thus permitting relative movement of adjacent frame units upon thermal expansion and contraction thereof, one leg of each unit being offset relative to the overlapping straight leg of the adjacent units whereby portions of the legs are in alignment and in engagement with the retaining members and providing a space between the offset portion of one leg and the end of an adjacent straight overlapping leg, and fastening means extending through said space and providing a clearance between the fastening means and said end of the adjacent straight overlapping leg to permit relative movement of adjacent frame units.

9. A wall structure as defined in claim 8 wherein each offset portion is provided with a notched guide lined as an alignment index for the end of the straight leg of its adjacent unit in the erection of the wall structure to provide said space.

10. A wall structure comprising a plurality of individual frame units which support building panels, means independently supporting adjacent individual frame units from the building, each frame unit including vertical and horizontal frame members, said vertical frame members having laterally extended front and rear marginal leg portions, the legs of adjacent frame units being arranged in overlapping engagement, a vertical retaining member frictionally engaging the overlapping legs of adjacent frame units, said retaining member being secured to a leg of one frame unit and engaging the other leg to effect frictional clamping of the overlapping leg of the adjacent frame unit, thus permitting relative movement of the frame units upon thermal expansion and contraction thereof, horizontal retaining members secured to the front of said horizontal frame members, and building panels supported in said frame units, said vertical and horizontal frame members having rear flange portions which engage the rear marginal faces of the building panels, and said vertical and horizontal retaining members having front flange portions which engage the front marginal faces of the building panels and frictionally retain the building panels between said front and rear flanges.

11. A wall structure as defined in claim 10 wherein the vertical and horizontal retaining members are provided with opposed front flange portions which engage the front marginal faces of adjacent building panels supported in the wall structure.

12. A wall structure as defined in claim 10, wherein the front flanges of the vertical and horizontal retaining members are recessed and provided with a caulking compound, said recessed flanges concealing the caulking compound to protect the same from the weather.

13. A wall structure comprising a plurality of individual frame units which support building panels, means independently supporting adjacent individual frame units from the building, each frame unit including vertical and horizontal frame members, said vertical frame members having laterally extended front and rear marginal leg portions, the legs of adjacent frame units being arranged in overlapping engagement, a vertical retaining member frictionally engaging the overlapping legs of adjacent frame units, said retaining member being secured to a leg of one frame unit and engaging the other leg to effect frictional clamping of the overlapping leg of the adjacent frame unit, thus permitting relative movement of adjacent frame units upon thermal expansion and contraction thereof, horizontal retaining members secured to the front of said horizontal frame members, said vertical and horizontal retaining members having curved lugs defining opposed grooves formed thereon, and snap-in trim members having opposed inwardly turned edge portions which are pressed over said lugs and engaged in said grooves.

14. A wall structure comprising a plurality of individual frame units which support building panels, each frame unit including vertical and horizontal frame members, said vertical frame members having laterally extended front and rear marginal leg portions, the legs of adjacent frame units being arranged in overlapping engagement, a vertical retaining member frictionally engaging the overlapping legs of adjacent frame units, said retaining member being secured to a leg of one frame unit and engaging the other leg to effect frictional clamping of the overlapping leg of the adjacent frame unit thus permitting relative movement of adjacent frame units upon thermal expansion and contraction thereof, and fastening means independently securing each individual frame unit to the building structure, said fastening means permitting thermal expansion and contraction of adjacent frame units.

15. A wall structure as defined in claim 14 wherein the fastening means independently securing the individual frame units to the building includes spandrel anchor members extended from the building structure, one anchor member having horizontally slotted openings and secured to the building structure, a second anchor member having vertically slotted openings and secured to the first anchor and to the vertical frame member of a unit.

16. A wall structure as defined in claim 14 wherein the lower frame units are supported on a track and are slidable longitudinally on said track upon thermal expansion and contraction thereof.

17. A wall structure as defined in claim 14 wherein the upper frame units are vertically aligned with the lower frame units and are independently supported and spaced therefrom to provide clearance for vertical thermal expansion and contraction thereof.

18. A wall structure comprising a plurality of individual frame units which support building panels, each frame unit including vertical and horizontal frame members, and means mounting adjacent frame units and permitting relative movement upon thermal expansion and contraction thereof, said mounting means including means independently supporting adjacent individual frame units from the building structure and further including a laterally extended portion from each unit arranged in overlapping engagement with an adjacent unit, retaining means frictionally engaging the overlapping portions of adjacent units and secured to one of the overlapping portions of one unit to effect clamping of the overlapping portion of an adjacent unit, said frame members having rear flange portions and said retaining means having front flange portions, and building panels frictionally retained between said front and rear flange portions, thus permitting relative thermal expansion and contraction of the panels and the frame units, said horizontal frame members having provision for receiving condensation accumulated on the interior face of the wall structure and communicating weep holes between the interior and exterior faces of the wall structure providing a drainage path for escape of the condensation to the exterior of the wall structure.

19. A wall structure comprising a plurality of individual frame units which support building panels, means independently supporting adjacent individual frame units from the building, each frame unit including vertical and horizontal frame members, said vertical frame members having laterally extended front and rear marginal leg portions, the legs of adjacent frame units being arranged in overlapping engagement with each other, a vertical retaining member frictionally engaging the overlapping legs of adjacent frame units, said retaining member being secured to a leg of one frame unit and engaging the other leg to effect frictional clamping of the overlapping leg of the adjacent frame unit, thus permitting relative movement of adjacent frame units upon thermal expansion and contraction thereof, horizontal retaining members secured to the front of said horizontal frame members, said vertical and horizontal retaining members having curved lugs defining opposed grooves formed thereon, and snap-in trim members having opposed inwardly turned edge portions which are pressed over said lugs and engaged in said grooves, said horizontal frame members having a trough formed in the rear wall thereof which receive condensation accumulated on the interior face of the wall structure, and communicating weep holes between the interior and exterior faces of the wall structure providing a drainage path for escape of the condensation across an inclined wall portion of said horizontal frame member, through said horizontal retaining member, and through the lower wall of said trim member.

20. A wall structure comprising a plurality of individual frame units which support building panels, each frame unit including vertical and horizontal frame members, and means mounting adjacent frame units and permitting relative movement upon thermal expansion and contraction thereof, said mounting means including means independently supporting adjacent individual frame units from the building structure and further including a laterally extended portion from each unit arranged in overlapping engagement with an adjacent unit, and retaining means frictionally engaging the overlapping portions of adjacent units and secured to one of the overlapping portions of one unit to effect clamping of the overlapping portion of an adjacent unit thereto, said horizontal members being hollow and provided with end inserts secured thereto and to the vertical frame members, said vertical and horizontal frame members having flange portions which engage the rear marginal faces of building panels supported therein, the flange portions of said vertical frame members being notched to provide clearance for the ends of said horizontal frame members whereby the vertical flanges are in alignment with the horizontal flanges.

21. A wall structure as defined in claim 20 wherein the retaining means includes vertical and horizontal retaining members having flange portions which engage the front marginal faces of the building panels, the flange portions of said vertical retaining members being notched to provide clearance for the ends of said horizontal retaining members whereby the flanges of the vertical retaining members are in alignment with the flanges of the horizontal retaining members.

References Cited in the file of this patent
UNITED STATES PATENTS

| 2,074,656 | Luhl | Mar. 23, 1937 |
| 2,800,983 | Toney | July 30, 1957 |

FOREIGN PATENTS

| 1,135,281 | France | Dec. 17, 1956 |
| 520,859 | Canada | Jan. 17, 1957 |